May 29, 1956  H. G. KLEMM ET AL  2,747,634
CUTTING MECHANISM FOR FORAGE CHOPPING MACHINES
Filed Sept. 11, 1952  3 Sheets-Sheet 1

INVENTORS.
HERMAN G. KLEMM &
BRANTFORD G. ELLIOTT
BY
Carlson, Pitzner, Hubbard & Wolfe
ATTORNEYS.

United States Patent Office 2,747,634
Patented May 29, 1956

2,747,634

CUTTING MECHANISM FOR FORAGE CHOPPING MACHINES

Herman G. Klemm, Birmingham, and Brantford G. Elliott, Royal Oak, Mich., assignors to Harry Ferguson, Inc., Detroit, Mich., a corporation of Delaware Application September 11, 1952, Serial No. 309,108

2 Claims. (Cl. 146—118)

The invention relates to machines for chopping hay or other forage crops into short lengths and it is more particularly concerned with improved means for cutting the material supplied to the machines and for discharging the cut material from the machine.

In machines of the above general character, the chopping or cutting of the crop material is usually effected by means of a rotatably driven cutter head having one or more blades or knives cooperating with a stationary cutter bar. There are two types of cutter heads in common use, namely the flywheel type and the cylinder or reel type. Each type has certain advantages as well as disadvantages.

In the flywheel type of cutter head, the knives are mounted radially at one end of the head and the crop material is fed axially thereto. By reason of this knife arrangement such cutter heads are relatively large in diameter and are therefore able to impart sufficient velocity to the cut material to discharge it from the machine. Moreover, such cutter heads can be made very short axially which is desirable because it reduces cost and enables the head to be accommodated in a relatively small space. On the other hand, flywheel type cutters are relatively inefficient in their cutting action due to the fact that the speed of the cutting edge of each knife varies progressively along its length.

In the cylinder type cutting head, the knives are arranged so that the cutting edges travel in a cylindrical path. The speed of the cutting edge is therefore uniform at all points along its length and cutting efficiency is high. However, cutting heads of this type are conventionally long and of relatively small diameter. The material cut by such heads is not accelerated sufficiently to discharge it from the machine effectively and consequently some type of conveying mechanism is required for that purpose. This increases the initial cost of the machine and also adds substantially to the work and expense of maintaining it in operating condition.

One object of the present invention is to provide an improved cutting mechanism for forage chopping machines of the above general character which affords the high operating efficiency of cylinder type cutters and at the same time realizes the advantages of compactness, low cost, and material accelerating characteristics heretofore obtained only with flywheel type cutters.

More specifically stated, it is an object of the invention to provide a cutter head which is efficient in operation, inexpensive to manufacture, and which, by eliminating the need for auxiliary material-conveying means, permits substantial simplification of the overall construction of the machine and facilitates maintenance of the same.

Another object is to provide a cutter head of the cylinder type in which the knives are mounted in a novel manner permitting the use of simple, inexpensive knives, quick and easy removal and replacement of individual knives, and accurate adjustment of individual knives relative to the head.

A further object is to provide a cutter head equipped with knives of substantial width positioned so as to impart sufficient velocity to the cut material to eject it through an outlet in the cutter housing and convey it to a desired discharge point.

Other objects and advantages of the invention will become apparent from the following detailed description of the preferred embodiment illustrated in the accompanying drawings in which.

Figure 1:
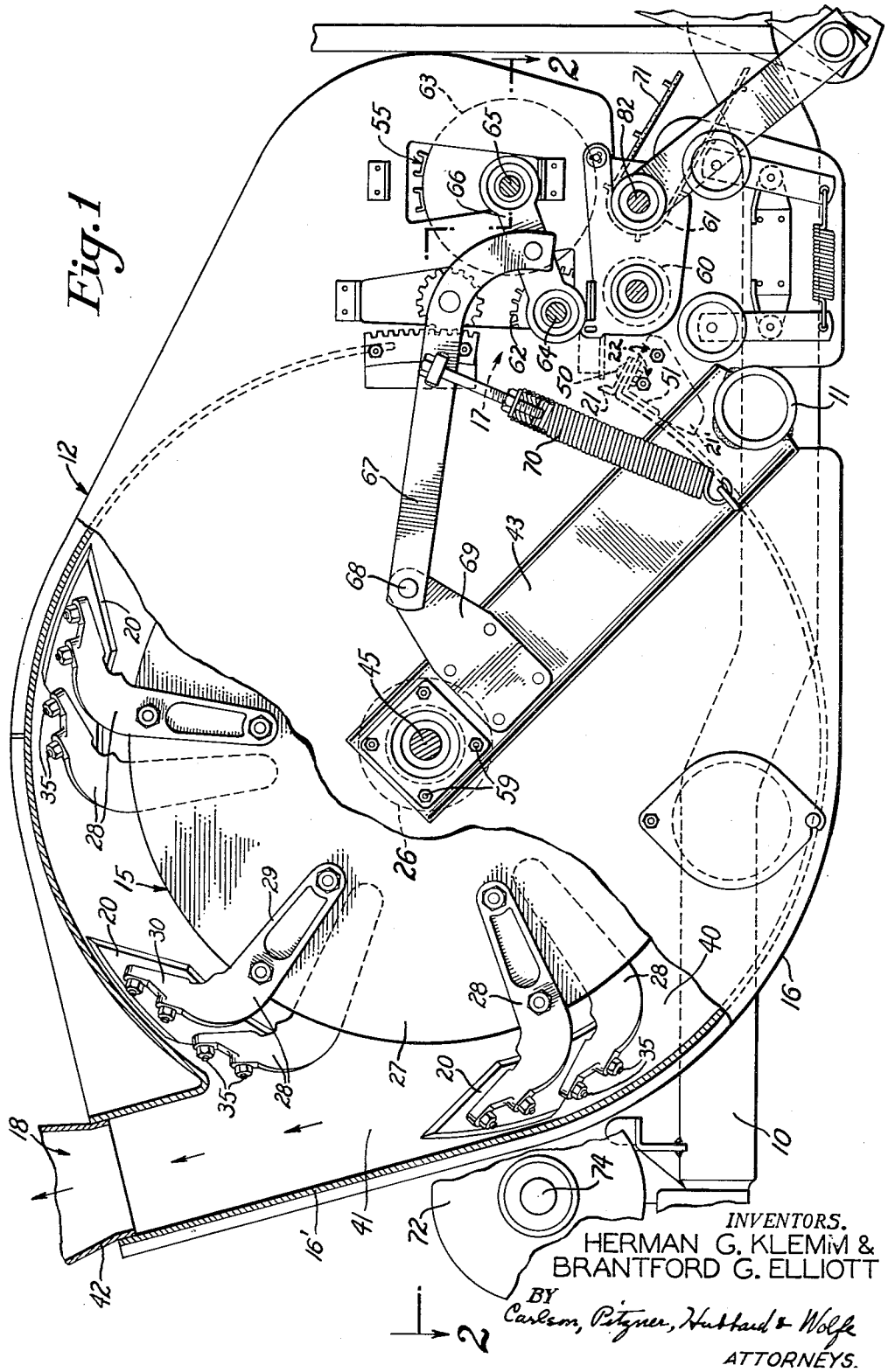
Figure 1 is a fragmentary side view of a forage chopping machine equipped with cutting mechanism embodying the features of the invention, the housing for the cutter head of the mechanism being partially broken away to show details of construction.

For purposes of illustration the improved cutting mechanism has been shown as incorporated in a mobile machine or implement adapted to be operated in the field for chopping green hay and similar forage crops into short lengths and for delivering it to a wagon or other vehicle for transportation to a silo, barn, or other place of storage. It is to be understood, however, that the invention may be incorporated in other types of implements and machines and, furthermore, that it may be utilized for chopping any type of forage crop material, either green or dry. It is also to be understood that there is no intention to limit the invention to the details of construction shown herein, but on the contrary, it is intended to cover all modifications and alternative constructions falling within the spirit and scope of the invention as expressed in the appended claims.

Referring now to the drawings, the improved cutting mechanism has been shown by way of illustration as embodied in a mobile implement adapted to be coupled in side-by-side relation to a tractor through the medium of a longitudinal frame member 10 and coupling elements associated therewith. The implement frame includes a transverse member 11 adapted to carry the cutting mechanism which is indicated generally at 12, and an outboard ground wheel 13 which cooperates with the tractor in supporting the implement.

The cutting mechanism 12 in its preferred form comprises generally a cylindrical cutter head 15 enclosed within a housing 16 having an inlet opening 17 at one side and an outlet opening 18 at the other side. The housing 16 is generally cylindrical, except for an outwardly inclined or generally tangential portion 16' adjacent the discharge opening 18. The cutter head 15 carries a series of blades or knives 20 having their cutting edges positioned to define a cylindrical path in the rotation of the head and to cooperate with a stationarily supported cutter bar 21 in severing forage material delivered through inlet opening 17 of the housing. The cutter bar is carried by a bracket 21' located adjacent the lower edge of the inlet opening 17 and adjustably secured to the implement framework as by bolts 22. The cutting edges of the knives have a small clearance with the arcuate wall of the housing between the inlet and discharge openings so that severed material is retained in the path of the knives and carried thereby from the cutter bar to the discharge opening through which it is ejected, as will appear presently.

In accordance with one important aspect of the invention, the advantage of small space requirements, low cost construction, and high velocity discharge of cut material are attained without sacrifice of cutting efficiency by making the cutter head relatively short axially and much larger in diameter than has been considered practical heretofore in cylinder type cutters, and by equipping it with relatively wide knives positioned with respect to their path of travel and to the housing wall so as to impart substantial velocity to the material severed with the cooperation of the cutter bar 21. While the precise dimensions of the cutter head and knives may vary for different types of machines or different operating conditions, it has been found that eminently satisfactory results can be obtained under ordinary operating conditions by constructing the cutter head so that the cylindrical path described by the cutting edges of the knives 20 has a diameter in the neighborhood of two times the axial length of the head. The knives are preferably constructed with a width to length ratio in the neighborhood of 1:4, and are positioned at an angle to their path of travel such as to enable them to act as impellers and impart the desired high velocity of the cut material when the cutter is rotated at a speed suitable for farm machines or implements.

Figure 2:
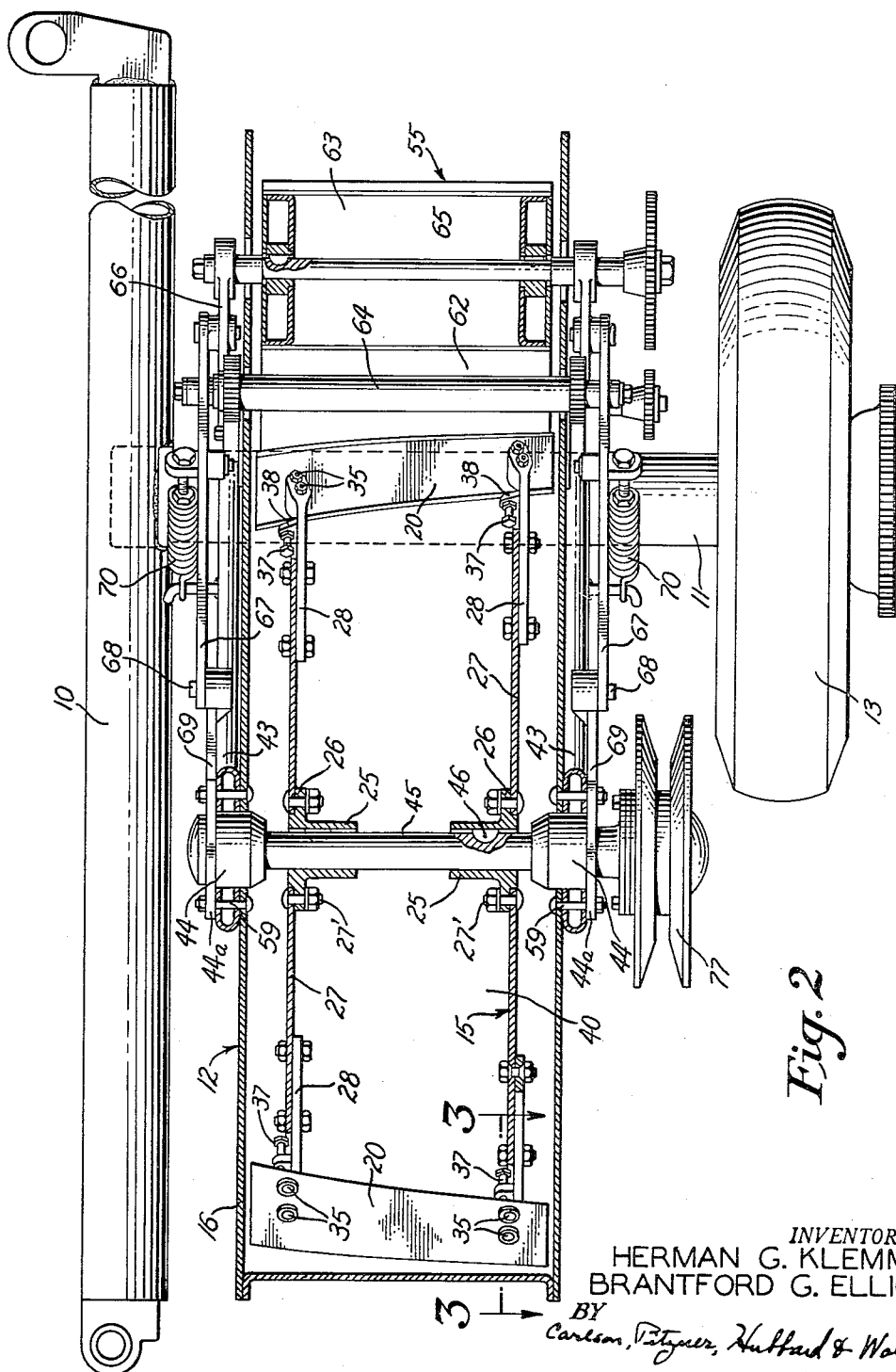
Fig. 2 is a sectional view through the cutter housing taken substantially on the line 2—2 of Fig. 1.

Turning now to a more detailed description of the exemplary cutting mechanism and referring to Figs. 1 and 2 of the drawings, the cutter head 15, as shown, comprises a cylindrical frame including a pair of axially aligned hub members 25 each having an outwardly turned flange 26 at its outer end to which the respective end members of the frame are secured. The end members, in this instance, comprise circular plates or discs 27 of sheet metal or other suitable material centrally apertured to accommodate the hubs and secured to the flanges thereof as by bolts 27'.

The knives 20 preferably comprise flat steel plates bent into spiral configuration along their longitudinal axes. One edge portion is subjected to suitable heat treatment and ground or otherwise machined to present a sharp cutting edge. The knives are supported on the end members 27 outwardly of the peripheral edges of the members by rigid arms 28 bolted or otherwise rigidly secured to the members. The particular cutter head shown is equipped with six of the knives 20 and, accordingly, each of the end members is provided with six arms 28 uniformly spaced apart around the member. To accommodate the spiral form of the knives, the arms of the respective members are arranged in pairs in staggered relation; that is, with one arm of each pair in advance of the companion arm as shown in Fig. 1.

As will be seen by reference to Figs. 1 and 2 of the drawings, the knives 20 are dimensioned lengthwise to extend axially of the cutter head across a pair of the supporting arms 28. The knives are suitably attached to the projecting ends of the arms which are constructed and disposed to hold the knives in a position to enable them to perform their dual material cutting and conveying functions. For this purpose each of the arms 28 is formed with a substantially straight shank portion 29 apertured for attachment to the frame members 27 by bolts or other suitable fastening elements. At its outer end the shank portion of the arm merges into a forwardly and outwardly projecting knife supporting portion 30 extending at an obtuse angle to the shank portion and presenting an elongated bearing surface 31 against which the inner face of the knife may be clamped. In the exemplary cutter head, the shanks 29 of the arms are disposed substantially radially with respect to the cutter head and the bearing surfaces are inclined forwardly therefrom at an angle of between 110° and 115°.

As assembled with the cutter head, the knives 20 are supported by the arms with their cutting edges facing in the direction of rotation of the cutter head. Moreover, the knives are disposed so as to project generally inwardly from the cutting edge and extend at an angle across the path along which the material severed by the cutting edge travels. Each of the knives thus presents its body portion as an inclined ledge operative to carry the cut material along in the rotation of the cutter head. Due to the inclination of the knife body, the centrifugal force acting upon the cut material as it is carried along tends to move the material outwardly with reference to the head. The arcuate portion of the housing 16 which is closely adjacent the cutting edges of the knives between the inlet and discharge openings prevents such outward movement of the material until it approaches the outwardly inclined portion 16' of the housing adjacent the discharge opening 18. At that point the material is discharged from the knives and expelled through the outlet opening 18 with substantial velocity. Any material slipping over the inner edge of a knife before it reaches the discharge point is picked up and carried along by the succeeding knife. With the particular knife arrangement herein shown, the main portion of the material is kept out of contact with the enclosing housing wall thereby reducing friction and minimizing wear on the parts.

Figure 3:
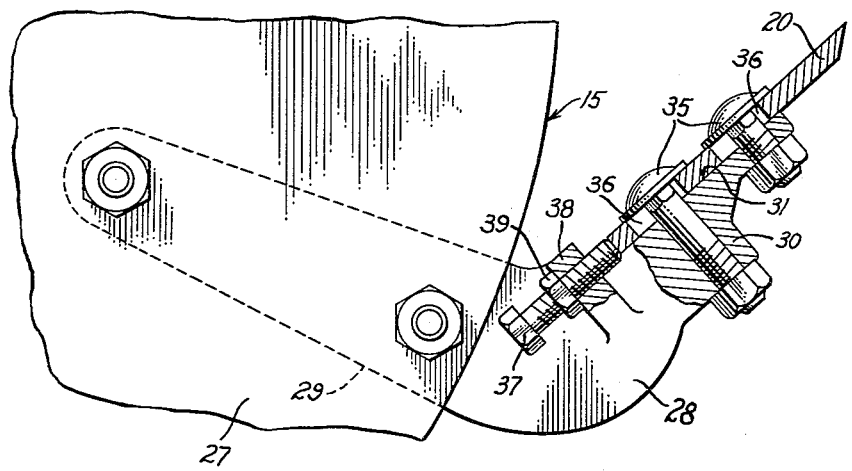
Fig. 3 is an enlarged fragmentary transverse sectional view through one of the knives and its associated supporting structure taken substantially on the line 3—3 of Fig. 2.

The arms 28 provide support for the knives 20 across their width, thus permitting the knives to be made of relatively thin stock and with a consequent saving in the cost of the expensive material preferred for service of this type. The knives are secured to the outer portions of the arms, with their sharpened cutting edges extending forwardly of the arms and, of course, facing in the direction of rotation of the cutter head. Suitable fastening elements, such as bolts 35, may be utilized for securing the knives to the arms. Each knife is formed with transverse slots 36 for the reception of the bolts to permit adjustment of the blades transversely of their length in compensating for wear of the cutting edge. As herein shown, the position of each knife is determined and adjustments are effected by stop screws 37 threaded through lugs 38 projecting at the sides of the arms adjacent the outer ends of the shanks 29, as shown in Fig. 3. These stop screws 37 are positioned to bear against the rear edge of the knife 20 adjacent its opposite ends. Lock nuts 39 may be provided on the screws for retaining them in adjusted position.

Ast indicated heretofore, the housing 16 completely encloses the cutter 15. The housing preferably comprises a sheet metal structure defining a cutter chamber 40 generally cylindrical throughout the major portion of its circumference and merging at one side into a widened section 41 in which the discharge opening 18 is positioned to receive cut material moving in a path approximately tangential to the path described by the knives 20. The usual discharge conduit or pipe 42 extends generally upwardly from the opening 18 as shown in Fig. 1.

Support for the housing 16 is provided in part by the cross member 11 of the implement frame and in part by a pair of rigid arms 43 extending upwardly and rearwardly from the frame member. The arms 43 additionally support the cutter head and to this end are provided with bearings 44 journaling a shaft 45 which extends through the hubs 25 of the cutter head. The shaft and hubs are constrained to rotate as a unit by means of keys 46. As shown in Fig. 2, the respective side walls of the housing are secured to the adjacent arm 43 and to a flanged portion 44a of the bearing 44 by bolts 59 passing through aligned apertures in the housing walls, the arms and the flanges 44a.

The stationary cutter bar 21 is located adjacent the inlet opening 17 of the housing so as to cooperate with the knives 20 in severing the material introduced through that opening. As shown in Fig. 1, the cutter bar is of the angle type and is adjustably secured as by bolts 50 to a rigid cross member 51 extending across the housing adjacent the lower edge of the opening 17. The bar 21 is formed with a sharp cutting edge facing upwardly in this instance, and positioned so that the knives 20 in passing produce a shearing effect on forage material entering through the opening 17. Adjustment of the cutter bar to compensate for wear of the bar or knives 20 may be effected by loosening the bolts 22 and shifting the bracket 21' and cutter bar toward the axis of the cutterhead. When the limit of such adjustment is reached, the cutter bar may be reset in the retracted position and the blades 20 shifted outwardly of the cutter head. The blades are ground in place to insure precise alinement of the edges and final adjustment is again effected by shifting the cutter bar.

In the exemplary apparatus, forage material to be cut or chopped is delivered to and fed through the inlet opening 17 of the cutter housing by feed mechanism 55 suitably supported on the implement frame forwardly of the housing. Briefly, the feed mechanim comprises a pair of lower feed rolls 60 and 61 and an opposed pair of upper rolls 62 and 63. The latter rolls are carried by shafts 64 and 65 respectively journaled at the opposite ends of two laterally spaced links 66. The links are pivotally supported intermediate their ends on the free ends of two laterally spaced levers 67 which in turn are pivoted, as at 68, on brackets 69 bolted or otherwise secured to the cutter supporting arms 43. Tension spring 70 connected between arms 43 and levers 67 urge the rolls 62 and 63 downwardly toward the opposed rolls 60 and 61 to grip the forage material and insure its movement through the opening 17 and into the cutting zone. As shown in Fig. 1, the forage material is carried to the forward pair of feed rolls 61 and 63 by a feed belt or apron 71 running over the roll 61.

The length to which the forage material is cut is determined by the rate at which it is advanced by the feed mechanism 55 for a given rotative speed of the cutter head. Obviously, the cutting length can be changed by varying one or the other of those rates. In practice the cutter head and feed mechanism are usually driven from a common power source through suitable gearing or other transmission means which permits such variations. In the exemplary apparatus both the cutter head and the feed mechanism are driven from a gear box 72 (Figs. 1 and 4) which in turn may be driven from the power take-off shaft 73 of the tractor by which the implement is drawn. It will be understood, of course, that power may be derived from an auxiliary engine mounted on or otherwise associated with the implement or machine in which the cutting mechanism is incorporated.

Figure 4:
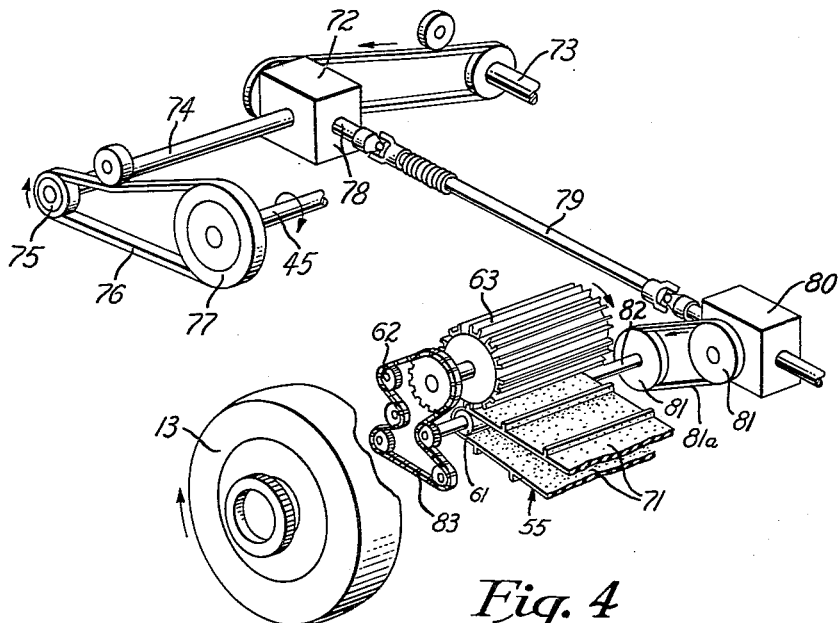
Fig. 4 is a diagrammatic view showing the drive for the cutter head and associated feed mechanism.

As shown in Fig. 4, the drive for the cutter head 15 includes a shaft 74 extending from the gear box 72 laterally of the implement frame and having a pulley 75 drivingly connected by a belt 76 with a pulley 77 fixed at one end of the cutter head shaft 45. Another shaft 78 extends forwardly from the gear box 72 and is connected by a universally joined shaft 79 with a second gear box 80. The latter gear box has an output shaft connected by pulleys 81 and a V-belt 81a with a shaft 82 upon which the feed roll 61 is mounted and by which the roll and the feed belt 71 are driven. The other feed rolls are driven from the shaft by means of a chain 83 engaging sprockets on the respective feed roll shafts.

In the operation of the improved cutting mechanism, the drives for the cutter head 15 and feed mechanism 55 are set in accordance with the length to which it is desired to cut the forage material. The material to be cut is deposited on the conveyor belt 71 in any preferred manner and is fed therefrom by the feed rolls 60—63 through the inlet 17 of the housing 16 and over the stationary cutter bar 21. As the cutter head 15 rotates, the knives 20 are carried successively into shearing engagement with the stationary cutter bar and cut off the material projected into the housing by the feed mechanism.

The cut off material is carried along by the knives 20 toward the outlet 18. Due to the centrifugal force acting on the material tending to move it outwardly of the cutter head and of the angular velocity imparted to the material by the knives 20, the material is discharged in substantially a straight line through the outlet opening 18 of the housing. By reason of their spacing from the rotational axis of the cutter head, knives 20 are enabled to impart sufficient velocity to the cut material to project it a substantial distance through the discharge pipe 42 when the cutter head is rotated at a relatively low speed, that is, within a speed range suitable for agricultural implements and machines. It will be understood, of course, that the movement of the material through the discharge pipe 42 is materially assisted by the current of air set up by the knives in the rotation of the cutter head. In other words, the cutter head in this instance functions as a blower and the dimensioning and positioning of the blades as above described materially assists in creating an air current sufficient to transport the cut material.

As the knives 20 become worn, or after sharpening, they may be adjusted for proper coaction with the cutter bar 21 by simply loosening the bolts 35 and turning up the stop screws 37. Preliminary adjustments may also be made by shifting the cutter bar. Moreover, the blades may be changed very quickly and easily by removing the bolts 35 and replacement blades may be installed with equal ease.

It will be apparent from the foregoing that the invention provides a cutting mechanism of novel and advantageous construction for forage chopping implements and machines. By utilizing the principles of the cylindrical cutter head, maximum cutting efficiency is obtained. On the other hand, the disadvantages of cylindrical cutters are avoided by making the cutter head relatively short axially and spacing the knives and their supporting elements much farther from their rotational axis than has been considered practicable heretofore. With this construction, sufficient velocity is imparted to the cut material and to the air in the cutter housing to discharge the material from the machine and deliver it to a suitable receptacle without requiring the assistance of auxiliary transport mechanisms such as separate blowers or mechanical conveyors.

The construction and mounting of the knives 20 for the performance of the dual function of severing material and, additionally, for carrying such material from the cutting zone to the discharge outlet is also highly advantageous. The mounting of the knives permits worn or broken knives to be replaced individually very easily and quickly and at minimum cost. Adjustment of the knives to compensate for wear, or repeated sharpening, is also easily accomplished.

The dimensioning and mounting of the knives 20 is an important factor in adapting them to perform their material transport and discharge function efficiently. Also, the orientation of the blades, that is, their inclination with respect to their path of travel, enables them to carry the cut material rather than just push it along the wall of the housing, thereby reducing friction and minimizing wear. At the same time sufficient velocity is imparted to the cut material and a strong air current is generated for carrying the material through the discharge pipe.

In general, it will be seen that the improved cutting mechanism is simple in construction, inexpensive to manufacture, and easy to maintain in operating condition. Furthermore, it is evident that it permits a substantial simplification of the implement or machine in which it is incorporated since its space requirements are small and since it eliminates the need for auxiliary conveyor mechanisms.

We claim as our invention:

1. A cutter head for forage chopping machines comprising, in combination, a rotatably supported frame, a plurality of elongated knives in the form of relatively thin flat strips bent into spiral configuration and each having a longitudinally extending cutting edge, means supporting said knives around the periphery of said frame with their cutting edges positioned to travel in a cylindrical path having a diameter approximately twice the axial length of the head, said supporting means including a pair of arms for each knife, each of said arms having a shank portion extending radially inwardly of the frame and rigidly secured thereto, a knife-carrying portion rigid with said shank portion and extending outwardly at an obtuse angle to said shank portion, means securing the knives to the arms, each of said knives having a width approximately one-fourth of its length and being inclined rearwardly and inwardly with respect to a plane tangent to the cylindrical path defined by the knife edges, the inclination of said knives coupled with their width adapting them to carry the cut off material and discharge it tangentially as the cutter head rotates through less than one-half of a revolution.

2. A cutter head for forage chopping machines comprising, in combination, a rotatably supported frame, a plurality of elongated relatively thin flat knives each having a longitudinally extending cutting edge, means supporting said knives around the periphery of said frame with their cutting edges and trailing edges positioned to travel in cylindrical paths spaced apart radially of the frame with the path of the cutting edges outermost, said supporting means including a pair of rigid arms for each knife, each of said arms having a shank portion extending generally radially inwardly of the frame and rigidly attached thereto, an outer end portion integral with said shank portion extending therefrom in the direction of rotation of the frame, the end portion of each arm being formed on its inner face with a flat bearing surface disposed at an obtuse angle to the shank portion of the arm and engageable with a knife to support the same, disengageable fastening means for rigidly clamping the knives against the bearing surfaces on the end portions of said arms, said knives being dimensioned crosswise so as to locate their cutting edges substantially farther from the axis of said frame than the outermost parts of said arms and their trailing edges substantially closer to that axis than said outermost parts of the arms.

References Cited in the file of this patent

UNITED STATES PATENTS

| | | |
|---|---|---|
| 1,076,714 | Stanat | Oct. 28, 1913 |
| 1,558,502 | Power | Oct. 27, 1925 |
| 1,564,586 | Krause | Dec. 8, 1925 |
| 1,639,807 | Oppenheim | Aug. 23, 1927 |
| 1,713,094 | Saiberlich | May 14, 1929 |
| 2,450,277 | Frudden | Sept. 28, 1948 |
| 2,594,583 | Richardson | Apr. 29, 1952 |
| 2,656,868 | Hintz et al. | Oct. 27, 1953 |

FOREIGN PATENTS

| | | |
|---|---|---|
| 672,100 | France | Sept. 14, 1929 |